J. B. ROOT.

Steam Generators.

No. 5,524. Reissued August 5, 1873.

Witnesses:

W. Lovell

H. C. Wattenberg.

Inventor:

John B. Root per Crosby & Gregory

Attys.

UNITED STATES PATENT OFFICE.

JOHN B. ROOT, OF NEW YORK, N. Y., ASSIGNOR, BY MESNE ASSIGNMENTS, OF ONE-THIRD INTEREST TO THOMAS C. M. PATON.

IMPROVEMENT IN STEAM-GENERATORS.

Specification forming part of Letters Patent No. 74,146, dated February 4, 1868; reissue No. 4,032, dated July 26, 1870; reissue No. 4,690, dated January 2, 1872; reissue No. 5,524, dated August 5, 1873; application filed May 20, 1873.

*To all whom it may concern:*

Be it known that I, JOHN B. ROOT, of the city, county, and State of New York, have invented a new and useful Improvement in Steam-Boilers, of which the following is a full, clear, and exact description, reference being had to the accompanying drawings forming part of this specification.

The invention consists of certain combinations of the parts of a water-tube boiler. The first of these combinations is composed of three series of instrumentalities, viz., a series of tubes arranged one above another in inclined positions, and each of uniform diameter from end to end, so that the steam generated within them tends to pass freely and rapidly to their highest ends, and to escape there while water is supplied to the tubes at their lower ends; a series of perforated heads for the lower ends of the tubes corresponding in number with the number of tubes, each of such heads being secured to its respective tube, and being perforated, so that the tubes of the lower series may be combined together at their low ends by connecting the passages of said perforated heads; and a series of perforated heads for the upper ends of said tubes, corresponding in number with the number of tubes, each of such heads being secured to its respective tube, and being perforated or otherwise formed with passages, one or more of which is of less transverse area than the area of the hollow space at the inner side of the head with which such perforation or passage through the head communicates when the tubes and heads are combined together. The second of the said combinations is composed of the aforesaid series of inclined water-tubes and a series of perforated heads for the upper ends of said tubes, the whole so combined that the upper ends of the said tubes and the connections between their heads form an obstructed passage of alternate enlargements and contractions.

In order that the invention may be fully understood, I have represented in the accompanying drawings, and will proceed to describe, a boiler embodying in it the best form known to me at the date of my application for the original patent.

Figure 1:
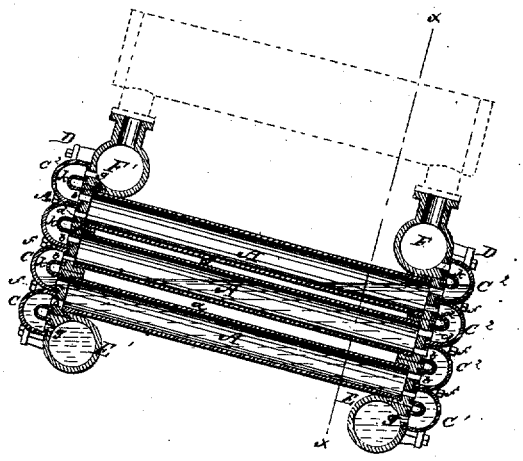
Figure 2:
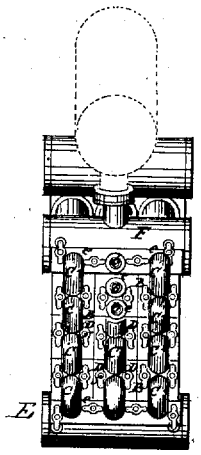
Figure 3:
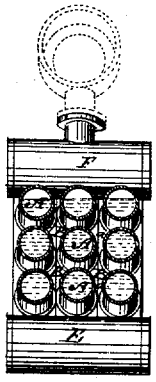

In the accompanying sheet of drawings, Figure 1 represents a longitudinal section through one of the series of tubes of said boiler. Fig. 2 represents an end view of the boiler with one of the connections and a part of another removed, and Fig. 3 represents a transverse section of the boiler at the line *x x* of Fig. 1.

The said boiler contains three series of tubes, each containing three tubes, A A A, arranged in inclined positions one above another, with spaces *a a* around the tubes for the passage of the products of combustion. These tubes are of uniform diameter from end to end, so that the steam generated within them may pass freely to their upper ends, and thus permit the water within them to have free access to their surfaces. Each of said tubes is screwed or otherwise fitted at its lower end to a head, B which is perforated with two passages, *b b*. Each of said tubes also is screwed or otherwise fitted at its upper end to a head, B, which is perforated with two passages, *b b*. The said heads are connected by the connections C C $C^1$ $C^2$, and the joints between the connections and the heads are made tight by means of rings *d*, of India rubber or other elastic packing, placed in sockets surrounding the openings of the heads. The connections are held in place by means of clamping-bars D, which lap over or onto lugs or projections *e*, and are fastened by nuts and stud-bolts *f* connected with the said heads, the said clamping-bars being, by preference, so constructed and arranged that one clamping-bar bears at the same time upon two of the connections. Cross-pipes E E′ F F′ are, or may be, arranged above and below the tubes A A at opposite ends, which cross-pipes should be connected with the upper and lower rows of the tubes A A by or through connections $C^1$ $C^2$, connecting the nearest of the passages *b* of said heads with passages *g* in a similar socketed manner to that used with the connections C C, and being similarly held or secured by clamping-bars and stud-bolts connected with the cross-pipes, only setting such clamping-bars to lie at right angles to those previously described, so that all the clamps or clamping-bars may be alike, as also all the heads B B and connections C C and $C^1$ $C^2$; likewise the main pipes or tubes A A; by which similarity or duplication of parts not only is there economy in construction, but increased facility afforded for fitting or changing of parts and extending or diminishing, by increasing or lessening the number of tubes, the capacity of the boiler at pleasure; and it will readily be perceived that by this construction any of the tubes A A may be removed without disturbing the others. The connections, being small, may be made light, but strong enough, of cast-iron, to prevent them bursting in advance of the tubes A A of sheet metal, while the latter, not being connected either with each other or the cross-pipes, excepting through the heads B B, are not cut away or weakened. If desired, the lower arms or legs of the connections may be made longer than the upper ones, so as to admit in an inclined position of the boiler, as represented, of the ends of the tubes A A and their heads B B lying in a vertical plane. The boiler generally, at least its sides, may be set in brick-work, but its ends, if desired, be covered by sheet-iron jackets, to prevent loss by radiation from said ends. In some cases the upper E′ of the lower cross-pipes may be dispensed with, the same serving mainly as a bearer; also, where a steam-drum (shown in dotted lines) is not used, or under other circumstances, the lower one F of the upper cross-pipes may likewise be omitted, leaving the upper one F′ of such pipes to answer as a steam chest or drum. In such a tubular boiler each tube that contains water acts as an independent small boiler, in which steam is generated, and which, being of uniform diameter from end to end, and being set in an inclined position, permits the steam generated at any point of its surface to pass freely and rapidly to its upper end, so that the contact of the water with its surface may prevent it from overheating. The steam collecting in the hollow space *k*, at the inner side of each upper head, tends to escape from said space through the upper passage of that head, while water is supplied to the tube through one of the passages of its lower head. As steam is generated in such a water-tube boiler with great speed, foam is produced, and the steam tends to pass from the tube out of the upper passage of the head intimately mixed with water. As, however, such passage of the head is of less transverse area than the transverse area of the hollow space *k* at the inner side of the head, the movement of the mixture of steam and water in an upward direction is obstructed and retarded, the steam is permitted to escape, and the escape of the water is obstructed. As the upper heads of the inclined tubes of each series are combined together, so that the steam passing from the upper passage of one upper head enters the lower passage of the upper head above it, and as the said passages are of less transverse area than the transverse area of the hollow spaces at the inner sides of the heads with which the passages communicate, and which form chambers between the lower and the upper passages of each upper head, a connected obstructed conduit for steam, composed of alternate hollow spaces or chambers and of passages of less transverse area than said chambers, is formed at the upper end of the series of inclined tubes for the passage of steam from the interiors of the tubes to the upper part of the boiler. As the obstruction to the free upward passage of the mixture of steam and water through this conduit (afforded by the reduced area of the passages from the hollow spaces at the inner sides of the heads) is operative upon the steam from all the inclined tubes of the series, the practical effect is that steam tends to issue at the upper end of the obstructed conduit unmixed with water, or in a much drier state than it would be if the conduit for steam were of uniform area throughout. Moreover, as the tubes are of uniform diameter throughout, the ordinary boiler-tubes of commerce may be used in the construction of the boiler.

Having thus described my invention, what I claim as new, and desire to secure by Letters Patent, is—

1. The combination and arrangement of a series of inclined boiler-tubes of uniform diameter, a corresponding set of perforated heads for the lower ends of said tubes, and a corresponding set of perforated heads for the upper ends of said tubes, in such manner that a connected conduit for water is formed at the lower ends of the set of boiler-tubes, and a connected obstructed conduit, composed of a series of alternate chambers and passages of less transverse area than the said chambers, is formed at the upper ends of the said tubes for the passage of the steam from their interiors to the upper part of the boiler.

2. A water-tube boiler constructed of a series of inclined water-tubes which are of uniform diameter throughout their length, and are provided with a series of heads, and are combined in such manner that the upper ends of said tubes and the connections between them form an obstructed passage of alternate contractions and enlargements.

JOHN B. ROOT.

Witnesses:
H. L. WATTENBERG,
G. M. PLYMPTON.